United States Patent
Lin

(10) Patent No.: US 7,599,153 B2
(45) Date of Patent: Oct. 6, 2009

(54) METHOD AND APPARATUS PROVIDING A STABILIZED TOP SHIELD IN READ HEAD FOR MAGNETIC RECORDING

(75) Inventor: Tsann Lin, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 502 days.

(21) Appl. No.: 11/362,628

(22) Filed: Feb. 27, 2006

(65) Prior Publication Data

US 2007/0201167 A1    Aug. 30, 2007

(51) Int. Cl.
*G11B 5/33* (2006.01)
(52) U.S. Cl. ..................................... 360/319
(58) Field of Classification Search ............... 360/319, 360/313, 324.2, 236.5, 324.12, 324.11
See application file for complete search history.

(56) References Cited

U.S. PATENT DOCUMENTS

| | | | |
|---|---|---|---|
| 5,901,018 A | 5/1999 | Fontana, Jr. et al. | |
| 5,910,870 A | 6/1999 | Ishiwata | |
| 6,437,949 B1 * | 8/2002 | Macken et al. | 360/319 |
| 6,456,467 B1 * | 9/2002 | Mao et al. | 360/319 |
| 6,747,852 B2 | 6/2004 | Lin et al. | |
| 6,807,031 B2 * | 10/2004 | Macken et al. | 360/317 |
| 6,847,510 B2 | 1/2005 | Childress et al. | |
| 6,921,587 B2 | 7/2005 | Hasegawa et al. | |
| 2002/0181164 A1 * | 12/2002 | Macken et al. | 360/319 |
| 2004/0165320 A1 | 8/2004 | Carey et al. | |
| 2005/0128647 A1 * | 6/2005 | Macken | 360/319 |
| 2007/0285847 A1 * | 12/2007 | Lin | 360/324.1 |

* cited by examiner

*Primary Examiner*—Allen T Cao
(74) *Attorney, Agent, or Firm*—Merchant & Gould

(57) ABSTRACT

A method and apparatus providing a stabilized top shield in a read head used for the longitudinal or perpendicular magnetic recording is disclosed. The top shield includes a laminate structure including at least three layers of ferromagnetic and antiferromagnetic films in a frame. Unidirectional anisotropy induced at the interface of the ferromagnetic and antiferromagnetic films is optimized by selecting suitable compositions and thicknesses to achieve the stabilization of the top shield while maintaining high permeability. In an alternative method, the top shield includes a ferromagnetic Ni—Fe film in a central region and multiple layers comprising ferromagnetic Co—Fe and Ni—Fe layers and an antiferromagnetic layer. Unidirectional anisotropy induced at the interfaces of ferromagnetic and antiferromagnetic layers by selecting suitable compositions and thicknesses of the ferromagnetic and antiferromagnetic layers to achieve the stabilization of the top shield through magnetostatic interactions between the central and side regions.

27 Claims, 13 Drawing Sheets

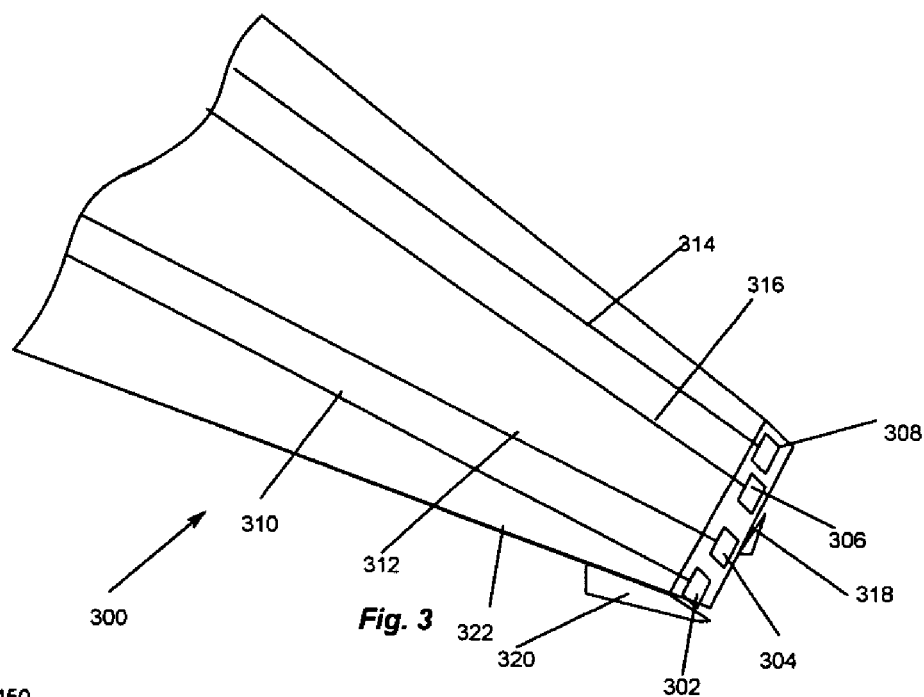
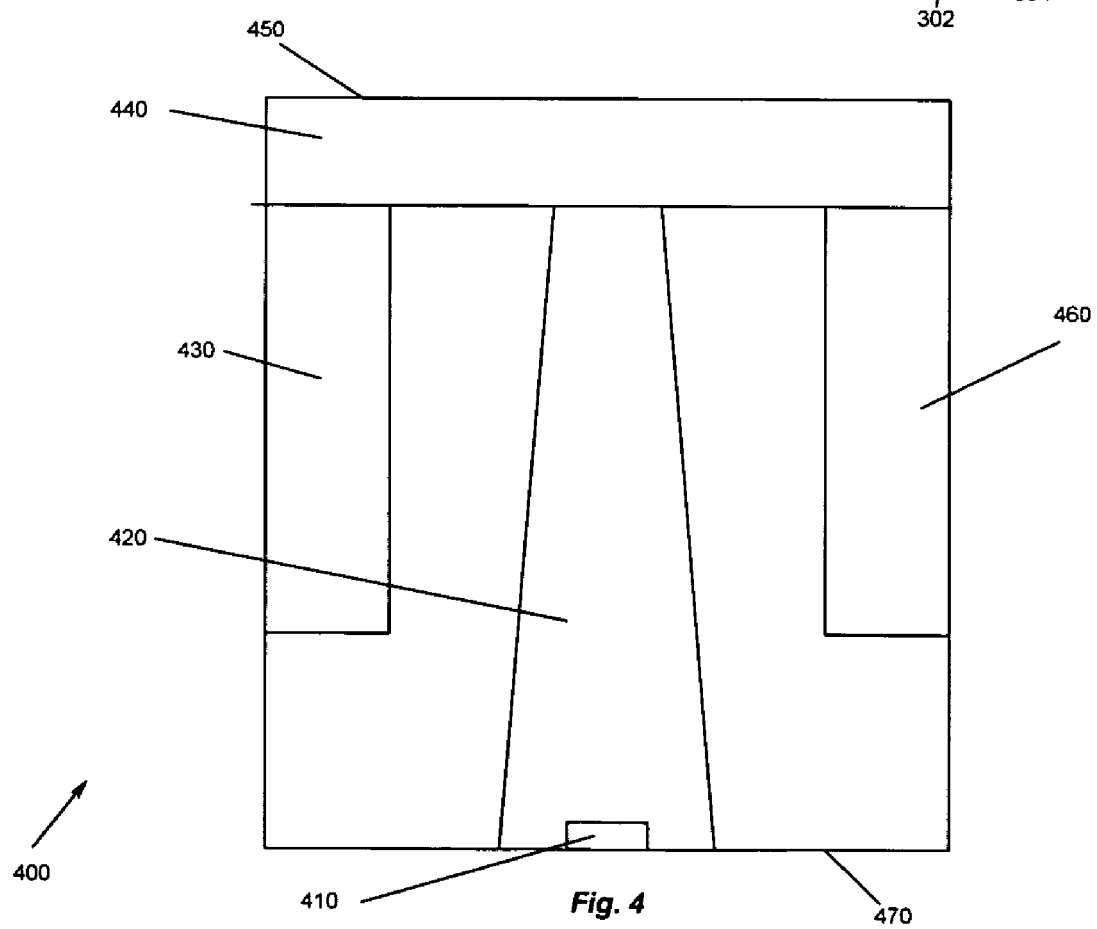

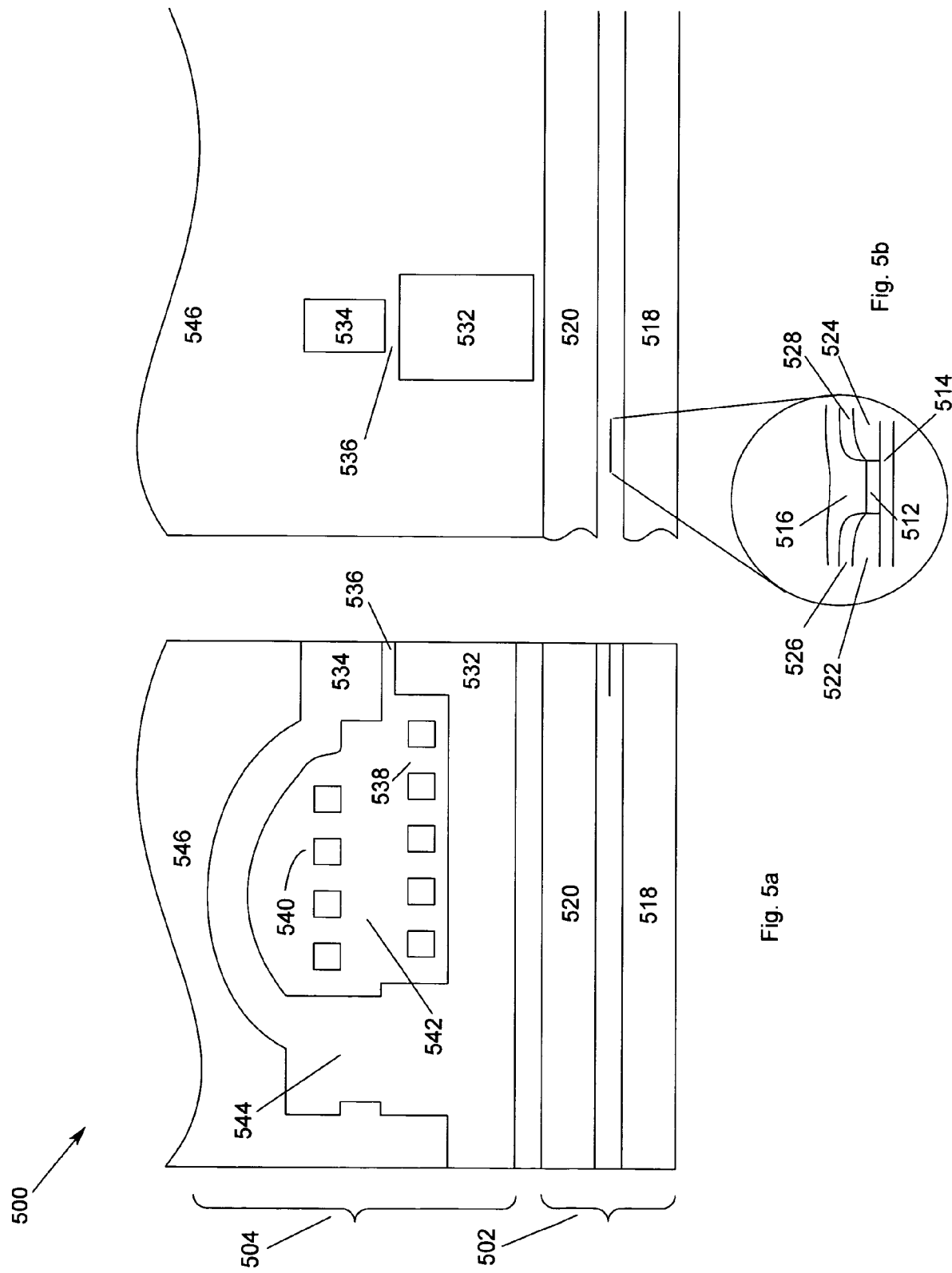

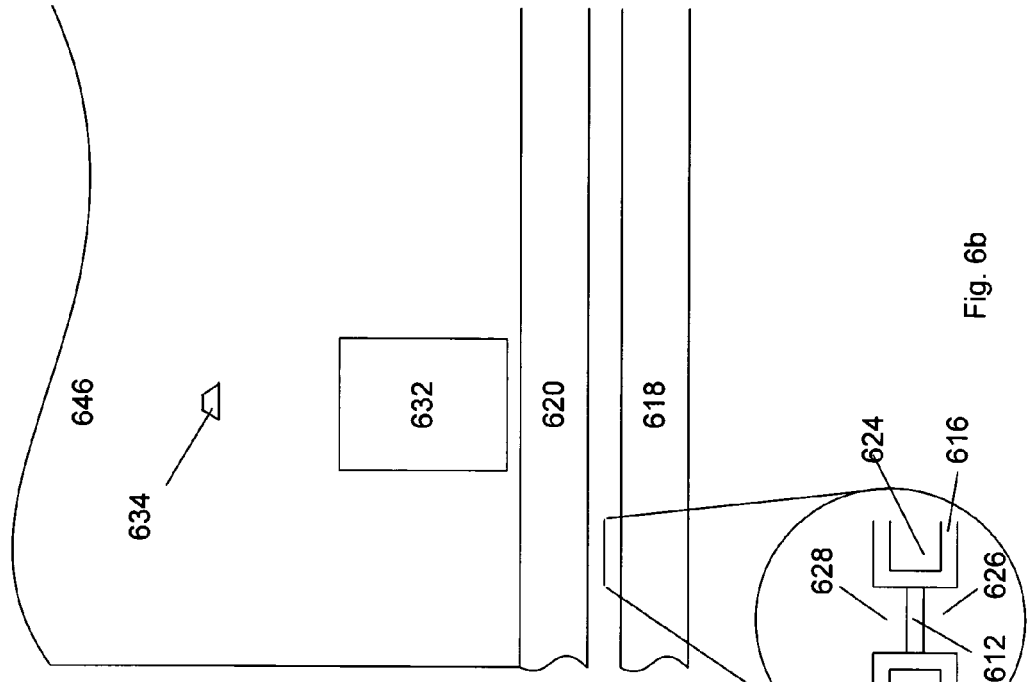
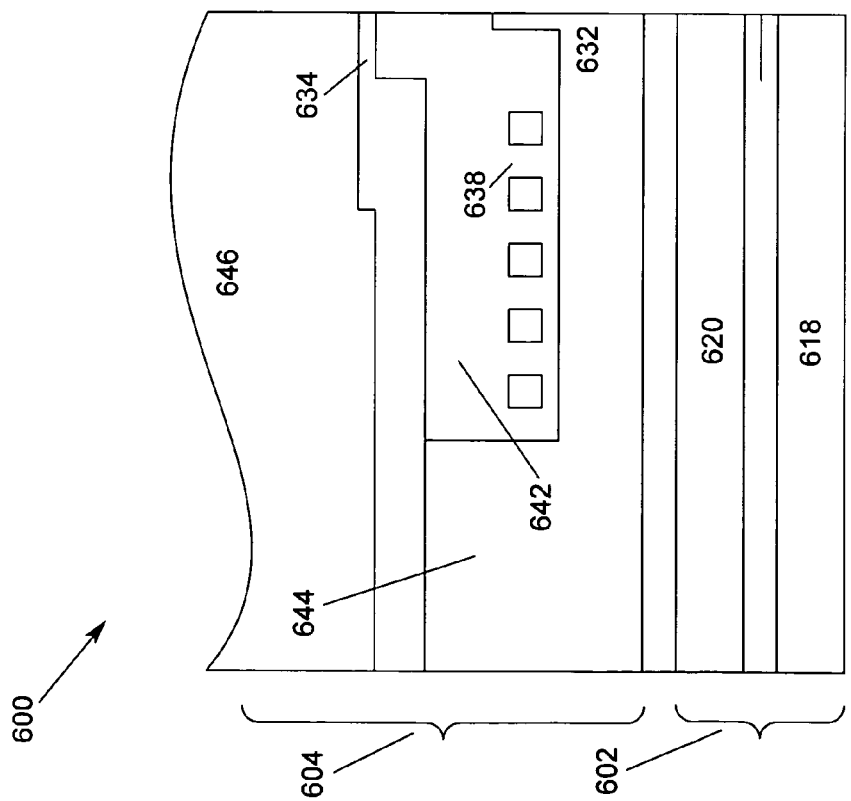
Fig. 6a
Fig. 6b

METHOD AND APPARATUS PROVIDING A STABILIZED TOP SHIELD IN READ HEAD FOR MAGNETIC RECORDING

BACKGROUND OF THE INVENTION

1. Field of the Invention

This invention relates in general to a transducer made of write and read heads used for longitudinal or perpendicular magnetic recording at ultrahigh densities in a data storage system, and more particularly to a method and apparatus providing a stabilized top shield in a read head used for the longitudinal or perpendicular magnetic recording.

2. Description of Related Art

The heart of a computer for longitudinal recording is a magnetic disk drive which includes a rotating magnetic disk, a slider that has a transducer made of write and read heads, a suspension arm above the rotating magnetic disk, and an actuator arm that swings the suspension arm to place the transducer over selected circular tracks on the rotating magnetic disk. When the magnetic disk is stationary, the suspension arm biases the slider into contact with the surface of the magnetic disk. When the magnetic disk rotates, air is swirled by the rotating magnetic disk, causing the slider to ride on an air bearing a slight distance from the surface of the rotating magnetic disk. When the slider rides on the air bearing, the transducer is employed for writing magnetic impressions to and reading magnetic signal fields from the rotating magnetic disk. The transducer is connected to processing circuitry that operates according to a computer program to implement the write and read functions.

A commonly used write head includes top and bottom poles, a write gap, a coil, and first, second and third insulation stacks. The write gap, coil and insulation stacks are sandwiched between the top and bottom poles. The top and bottom poles are connected at the back of the write head. Current conducted to the coil induces a magnetic flux in the top and bottom poles, which cause a magnetic field to fringe out at the air bearing surface of the write head for the purpose of writing the aforementioned magnetic impressions in circular tracks on the aforementioned rotating magnetic disk.

A commonly used read head includes top and bottom shields, top and bottom gaps, a giant magnetoresistance (GMR) read sensor in a read region, and bias stack and conducting leads in side regions. The read sensor, bias stack and conducting leads are sandwiched between the top and bottom gaps, which are in turn sandwiched between the top and bottom shields. In order to perform longitudinal magnetic recording at ultrahigh densities of above 100 Gb/in$^2$, the read head has been progressively miniaturized by fabricating the read sensor as thin as 40 nm, as narrow as 60 nm, and as short as 80 nm, and sandwiching the read sensor into the top and bottom gaps as thin as 20 nm. In order to perform stable read function, the bias stack has been progressively improved to suppress domain activities in the sense layer of the ever-smaller read sensor.

On the other hand, the top and bottom shields still remain as thick as more than 1,000 nm. These shields must be so thick to shield the read sensor from unwanted magnetic fluxes stemming from a rotating magnetic disk, and allow the read sensor to only receive needed magnetic fluxes penetrating into the gap between the shields during reading. To ensure the shield efficiency, these shields must exhibit anisotropic soft magnetic properties, such as an easy-axis coercivity ($H_{CE}$) of below 10 Oe, a hard-axis coercivity ($H_{CH}$) of below 2 Oe, and a uniaxial anisotropy field ($H_K$) of below 20 Oe, and a negative saturation magnetostriction. These shields also must be magnetically stable against strong write fields during writing, in order to prevent magnetization of the shields from either rotation into unstable magnetic states or switching into an opposite stable magnetic state. The magnetization rotation induces domain activities in the shields, thus also inducing domain activities in the read sensor through magnetostatic interactions and causing noises during reading. The magnetization switching may decrease a longitudinal bias field provided by the bias stack, thus leading to difficulties in stabilizing the sense layer of the read sensor. So far, there have no special approaches to improving magnetic properties of these shields or to stabilizing the magnetizations of these shields.

Three additional challenges are posed in stabilizing the top shield than the bottom shield. First, the top shield is formed on the top gap, while the bottom shield is formed on an undercoat. Any non-ferromagnetic films underneath these shields, which may either improve magnetic properties of these shields or stabilize the magnetizations of these shields, cannot be used for the top shields due to concerns on unwanted gap increases, but can be used for the bottom leads. Second, the top shield is wavy on the gap with a very steep topography, while the bottom shield is flat on the undercoat with a very smooth topography. It is thus more difficult for domains in the top shield to function stably. Third, the top shield is closer to the top and bottom poles than the bottom shield, and its domains are thus more severely disturbed by write fields.

More stringent challenges are posed for recently extensively explored perpendicular magnetic recording. A main pole in a write head produces much stronger write fields, which more severely affect domain activities in the top and bottom shields. A tunneling magnetoresistance (TMR) read sensor in a read head requires a sense current flowing through the top or bottom shields, which induces fields and thus affects domain activities in the top and bottom shields. In addition, top and bottom shields are thinner for minimizing thermal extrusion at an air bearing surface. These thinner top and bottom shields are more susceptible to fields produced by the adjacent main pole and induced by the sense current.

It can thus be seen that a method and apparatus providing a stabilized top shield in a read head used for the longitudinal or perpendicular magnetic recording.

SUMMARY OF THE INVENTION

To overcome the limitations in the prior art described above, and to overcome other limitations that will become apparent upon reading and understanding the present specification, this invention discloses a method and apparatus providing a stabilized top shield in a read head used for the longitudinal or perpendicular magnetic recording.

The present invention solves the above-described problems by forming a laminate structure that includes laminated ferromagnetic Ni—Fe and antiferromagnetic Ir—Mn—Cr bias films. Unidirectional anisotropy is optimized by selecting suitable compositions and/or thicknesses of the films in order to achieve the stabilization of the top shield while maintaining its high permeability.

A top shield for a read sensor in accordance with an embodiment of the present invention includes a laminate structure, wherein shield and bias layers are alternatively deposited.

In another embodiment of the present invention, a method for forming a top shield is provided. The method includes forming a laminate structure of alternating shield and bias layers.

In another embodiment of the present invention, a storage device is provided. The storage device includes a moveable magnetic storage medium for storing data thereon, a slider that has a transducer made of write and read heads, a suspension arm above the rotating magnetic disk, an actuator arm that swings the suspension arm to place the transducer over selected areas of the magnetic storage medium and a magnetoresistive sensor, coupled to the actuator, for reading data from the magnetic recording medium when position to a desired location by the actuator, wherein the magnetoresistive sensor further comprises a top shield layer, the top shield layer comprises a laminate structure formed by alternately depositing shield and bias layers.

These and various other advantages and features of novelty which characterize this invention are pointed out with particularity in the claims annexed hereto and form a part hereof. However, for a better understanding of this invention, its advantages, and the objects obtained by its use, reference should be made to the drawings which form a further part hereof, and to accompanying descriptive matter, in which there are illustrated and described specific examples according to this invention.

BRIEF DESCRIPTION OF THE DRAWINGS

Referring now to the drawings in which like reference numbers represent corresponding parts throughout:

FIG. 3 illustrates an assembly of a transducer, a slider and a suspension according to an embodiment of the present invention;

FIG. 4 is an ABS view of a transducer and a slider according to an embodiment of the present invention;

FIGS. 5a-5b illustrates cross-sectional views of a transducer used for longitudinal magnetic recording according to an embodiment of the present invention;

FIGS. 6a-6b illustrates cross-sectional views of a transducer used for perpendicular magnetic recording according to an embodiment of the present invention;

DETAILED DESCRIPTION OF THE INVENTION

In the following description of the exemplary embodiment, reference is made to the accompanying drawings, which form a part hereof, and in which is shown by way of illustration the specific embodiment in which the present invention may be practiced. It is to be understood that other embodiments may be utilized as structural changes may be made without departing from the scope of the present invention.

The present invention provides a method and apparatus providing a stabilized top shield in a read head used for the longitudinal or perpendicular magnetic recording. A laminate structure is formed that comprises laminated ferromagnetic Ni—Fe and antiferromagnetic Ir—Mn—Cr films. Unidirectional anisotropy is optimized by selecting suitable compositions and thicknesses of the films in order to achieve the stabilization of the top shield while maintaining high permeability. In one embodiment of the present invention, the top shield includes a laminate structure includes laminated ferromagnetic Ni—Fe and antiferromagnetic Ir—Mn—Cr films in a frame. Unidirectional anisotropy induced at Ni—Fe/Ir—Mn—Cr interfaces is optimized by selecting suitable compositions and thicknesses of the Ni—Fe and Ir—Mn—Cr films, in order to achieve the stabilization of the top shield while maintaining high permeability. In an alternative method, the top shield includes a ferromagnetic Ni—Fe film in a central region of a frame, and multiple layers comprising ferromagnetic Ni—Fe, ferromagnetic, antiferromagnetic Ir—Mn—Cr, ferromagnetic Co—Fe and ferromagnetic Ni—Fe films in side regions of the frame. Unidirectional anisotropy induced at the Co—Fe/Ir—Mn—Cr and Ir—Mn—Cr/Co—Fe interfaces in the side regions is maximized by selecting suitable compositions and thicknesses of the Co—Fe and Ir—Mn—Cr films, in order to achieve the stabilization of the top shield through magnetostatic interactions between the central and side regions.

Figure 1:
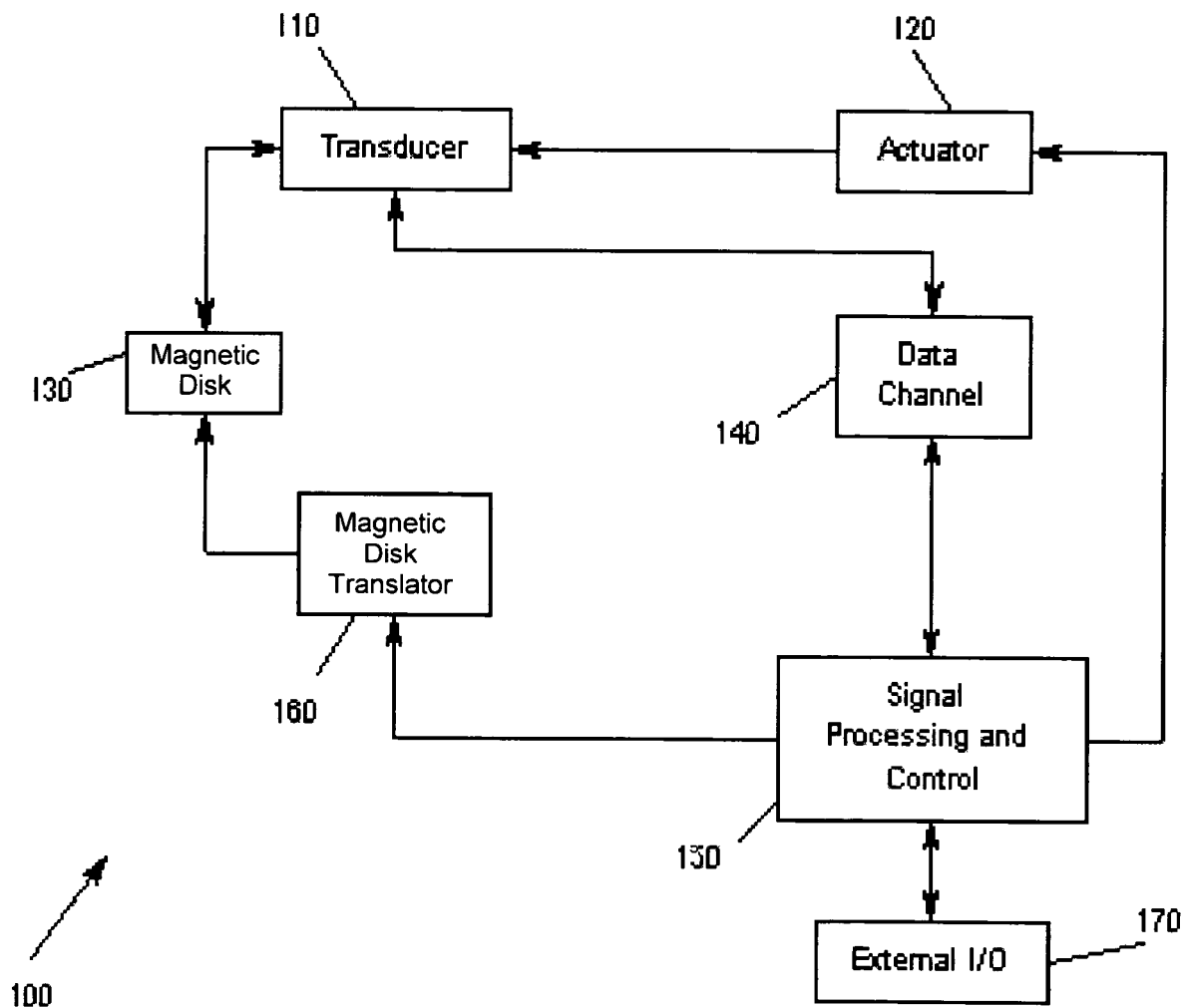
FIG. 1 illustrates a storage system according to an embodiment of the present invention.

FIG. 1 illustrates a storage system 100 according to an embodiment of the present invention. The position of a transducer made of write and read heads 110 is controlled by an actuator 120. The transducer 110 writes and reads data on a magnetic disk 130. The write and read signals are passed to a data channel 140. A signal processor 150 controls the actuator 120 and processes the signals of the data channel 140 for data exchange with external Input/Output (I/O) 170. In addition, a magnetic disk translator 160 is controlled by the signal processor 150 to cause the magnetic disk 130 to move relative to the transducer 110. This invention is not meant to be limited to a particular type of the storage system 100 or to the type of the magnetic disk 130 used in the storage system 100.

Figure 2:
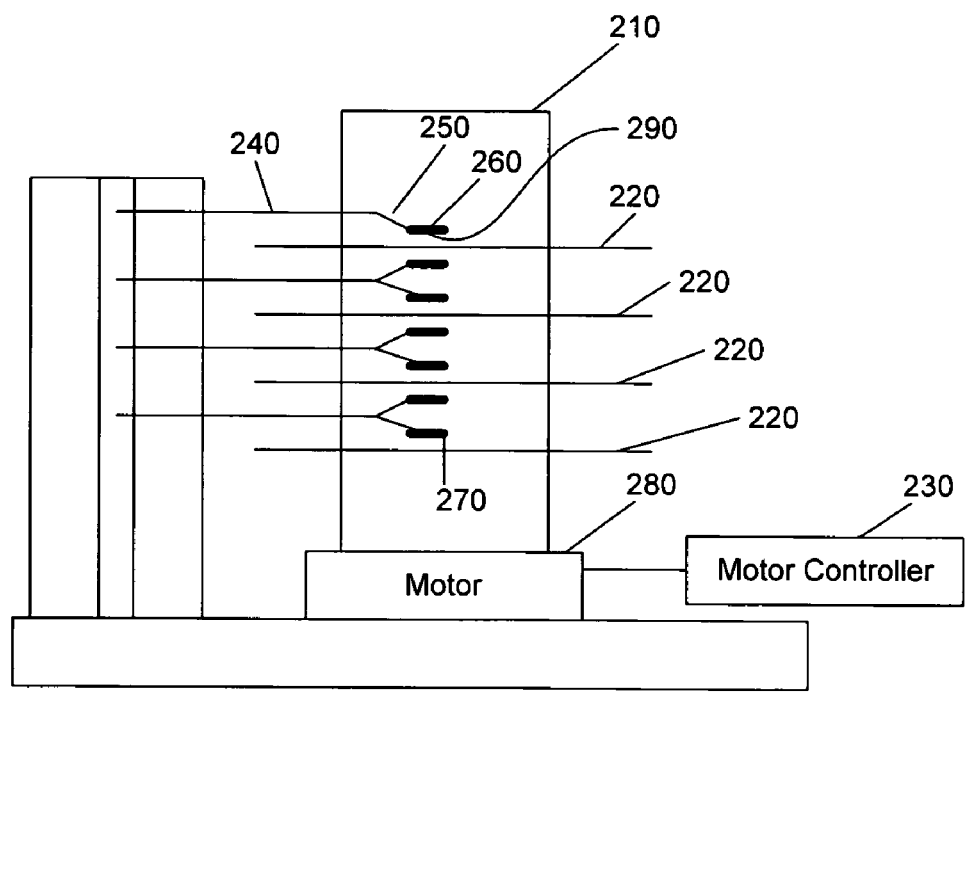
FIG. 2 illustrates a multiple magnetic disk storage system according to an embodiment of the present invention.

FIG. 2 illustrates a multiple magnetic disk storage system 200 according to an embodiment of the present invention. The multiple magnetic disk storage system 200 includes a spindle 210 that supports and rotates multiple magnetic disks 220. The spindle 210 is rotated by a motor 280 that is controlled by a motor controller 230. The transducer 270 is supported by a slider 260. The slider 260 is mounted on a suspension 250. The suspension 250 is controlled by an actuator arm 240. Processing circuitry exchanges signals that represent information with the transducer 270, provides motor drive signals for rotating the magnetic disks 220, and provides control signals for moving the slider 260 to various tracks. Although the multiple magnetic disk storage system is illustrated, a single magnetic disk storage system is equally viable according to embodiments of the present invention.

The suspension 250 and actuator arm 240 position the slider 260 so that the transducer 270 is in a transducing relationship with a surface of the magnetic disk 220. When the magnetic disk 220 is rotated by the motor 280, the slider 260 is supported on a thin cushion of air (air bearing) between the surface of the magnetic disk 220 and the air bearing surface (ABS) 290. The transducer 270 may then be employed for writing information to multiple circular tracks on the surface of the magnetic disk 220, as well as for reading information therefrom.

FIG. 3 illustrates an assembly 300 of a transducer 318, a slider 320 and a suspension 322. The transducer 318 is supported on the slider 320, and the slider 320 is mounted on the suspension 322. First and second pads 302 and 304 connect the read head of the transducer 318 to leads 310 and 312, respectively, on the suspension 322. Third and fourth pads 306 and 308 connect the write head of the transducer 318 to leads 316 and 314, respectively, on the suspension 322.

FIG. 4 is an ABS view of the slider 400 and the transducer 410. The slider 400 has side rails 430 and 460 and a center rail 420. The transducer 410 is provided and may be supported on the central rail 420. The rails 420, 430 and 460 extend from a cross rail 440. With respect to rotation of a magnetic disk, the cross rail 440 is at a leading edge 450 of the slider 400 and the transducer 410 is at a trailing edge 470 of the slider 400.

The above description of a typical magnetic recording disk drive system, shown in the accompanying FIGS. 1-4, is for presentation purposes only. Storage systems may contain a large number of recording disks and actuators, and each actuator may support a number of sliders.

FIGS. 5a and 5b show cross-sectional views of a transducer 500 used for longitudinal magnetic recording according to an embodiment of the present invention. In FIGS. 5a and 5b, the transducer 500 is shown in planes perpendicular and parallel to the ABS, respectively. The transducer 500 includes a read head 502 and a write head 504 used for longitudinal magnetic recording. The read head 502 includes a giant magnetoresistance (GMR) sensor 512 used in a current-in-plane mode, bottom and top nonmagnetic electrically insulating gaps 514, 516, bottom and top ferromagnetic shields 518, 520, first and second bias stacks 522, 524, and first and second conducting leads 526, 528. The GMR sensor 512 is sandwiched between the bottom and top gaps 514, 516, which are in turn sandwiched between the bottom and top shields 518, 520. In addition, the GMR sensor 512 is connected with the first and second bias stacks 522, 524, which are in turn connect with the first and second conducting leads 526, 528, respectively. In response to external magnetic fields, the resistance of the GMR sensor 524 changes. A sense current conducted through the first bias stack and conducting leads 522, 526, the GMR sensor 512, and the second bias stack and conducting leads 524, 528 causes these resistance changes to be manifested as potential changes.

The write head 504 includes bottom and top poles 532 and 534, a write gap 536, first and second coils 538, 540, and an insulation stack 542. The write gap 536, the first and second coils 538, 540, and the insulation stack 542 are sandwiched between the bottom and top poles 532, 534. The bottom and top poles 532, 534 are magnetically coupled at a back gap 544, and are coated with an overcoat 546.

FIGS. 6a and 6b show cross-sectional views of a transducer 600 used for perpendicular magnetic recording according to an embodiment of the present invention. In FIGS. 6a and 6b, the transducer 600 is shown in planes perpendicular and parallel to the ABS, respectively. The transducer 600 includes a read head 602 and a write head 604 used for perpendicular magnetic recording. The read head 602 includes a tunnel magnetoresistance (TMR) sensor 612 used in a current-perpendicular-to-plane mode, first and second conducting leads 626, 628, and bottom and top shields 618, 620, first and second insulators 614, 616, and first and second bias stacks 622, 624. The TMR sensor 612 is electrically connected with the first and second conducting leads 626, 628, which are in turn electrically connected with the bottom and top shields 618, 620, respectively. In addition, the TMR sensor 612 is isolated by the first insulator 614 from the first bias stack 622, and is isolated by the second insulator 616 from the second bias stack 624. In response to external magnetic fields, the resistance of the TMR sensor 612 changes. A sense current conducted through the bottom shield 618, the first conducting leads 626, the TMR sensor 612, the second conducting leads 628, and the second top shield 620, causes these resistance changes to be manifested as potential changes.

The write head 604 includes a main pole 634, au auxiliary pole 632, a coil 638, and an insulation stack 642. The coil 638 and the insulation stack 642 are sandwiched between the main pole 634 and the auxiliary pole 632. The main pole 634 and the auxiliary pole 632 are magnetically coupled at a back gap 644, and are coated with an overcoat 646.

In the fabrication process of a read head as shown in FIG. 6, a 300 nm thick Ni—Fe bottom shield is deposited and patterned on a wafer. A read sensor, preferably comprising Ta(3)/Ru(2)/Ir—Mn—Cr(6)/Co—Fe(2.4)/Ru(0.7)/Co—Fe(2.4)/Mg—O(0.8)/Co—Fe(1)/Ni—Fe(2)/Ta(3)/Ru(6)/Ta(3) films, is then deposited in a field of 100 Oe parallel to a pre-determined longitudinal direction on the wafer. The wafer is annealed in a field of 50,000 Oe perpendicular to the longitudinal direction for 5 h at 240° C. This anneal is conducted for the formation of a transverse flux closure structure comprising Ir—Mn—Cr/Co—Fe/Ru/Co—Fe films. After this anneal, a photoresist is applied and exposed in a photolithographic tool to mask the read sensor in a read region. The read sensor in unmasked side regions is removed by ion mill until the Ni—Fe bottom shield is exposed, and then a 10 nm thick $Al_2O_3$ film, a bias stack comprising Cr(6)/Co—Pt—Cr (20) films, and another 10 nm thick $Al_2O_3$ film are deposited on the side regions. After the photoresist is removed by chemical mechanical polishing, a top shield 620 according to one embodiment of the present invention is formed. The top shield 620 according to one embodiment of the present invention is described in more detail with reference to FIG. 7. After the top shield 620 is formed, a 100 nm thick $Al_2O_3$ insulator layer is deposited. The wafer is annealed again in a field of 1,000 Oe parallel to the longitudinal direction for 2 h at 220° C. This second anneal is conducted for the top pole to develop unidirectional anisotropy needed for stabilizing the top pole, without interrupting magnetizations in the Ir—Mn—Cr/Co—Fe/Ru/Co—Fe transverse flux-closure structure in the TMR sensor 612.

In the fabrication process of a write head as shown in FIG. 6, a 2,000 nm thick Ni—Fe auxiliary pole is deposited and patterned, and then a coil and an insulation stack are formed within the auxiliary pole. After chemical mechanical polishing, a main pole comprising a 30 nm Fe—Ni film is deposited and patterned. After depositing 20 μm thick $Al_2O_3$ overcoat on the wafer, the wafer is cut and mechanically lapped into many sliders.

Figure 7:
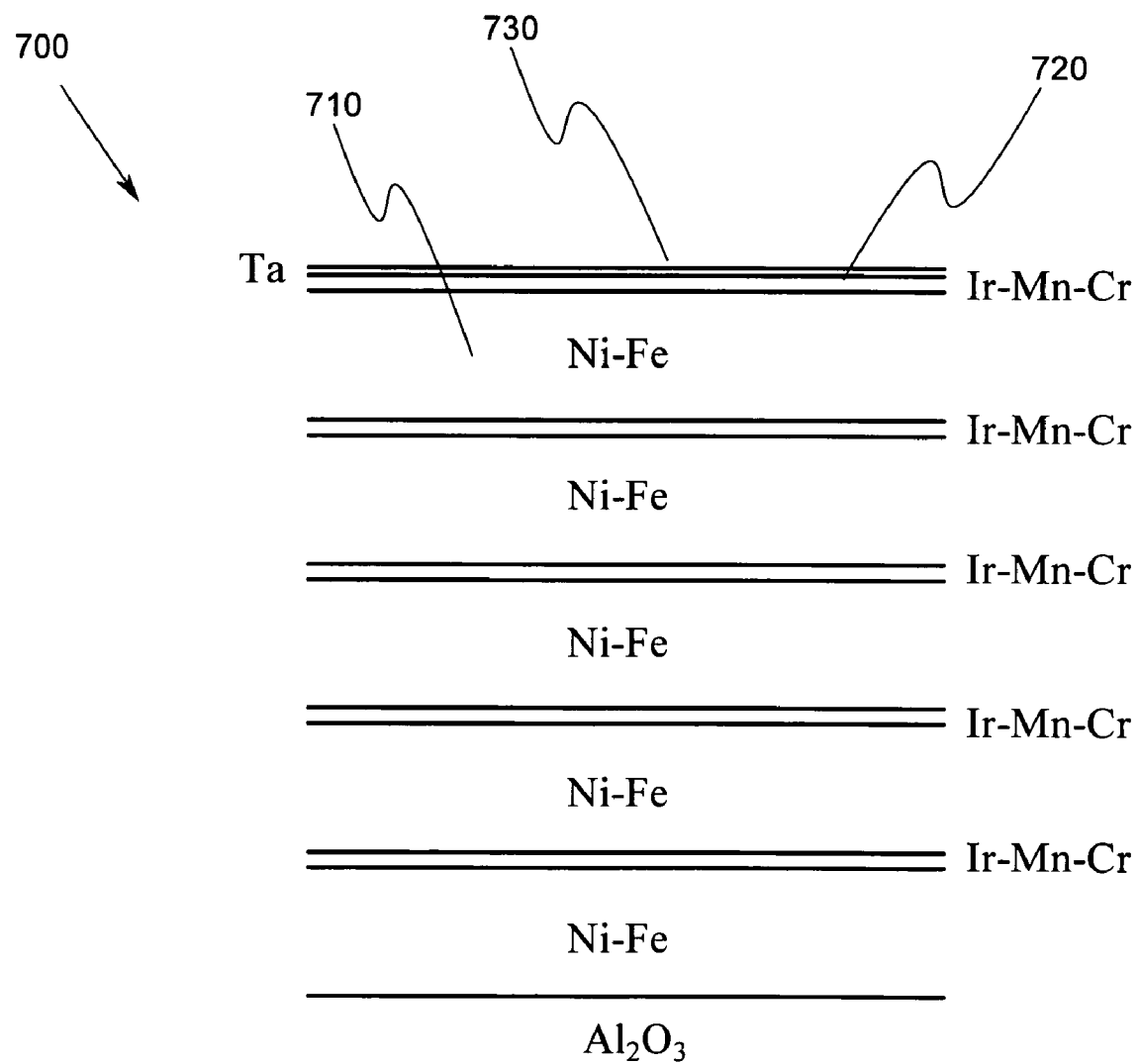
FIG. 7 illustrates a top shield according to one embodiment of the present invention.

FIG. 7 illustrates a top shield 700 according to one embodiment of the present invention. The top shield 700 comprises at least five laminates of 48.4 nm thick ferromagnetic Ni—Fe 710 and 6 nm thick antiferromagnetic Ir—Mn—Cr bias films 720, as well as a 3 nm thick Ta cap layer 730. According to this embodiment of the present invention, as shown in FIG. 7, no nonmagnetic seed or antiferromagnetic pinning layers are used beneath the first Ni—Fe shield layer. Previously, a 3 nm thick Ta and 2 nm thick Ru films were used as seed layers, and a 6 nm thick Ir—Mn—Cr film were used as underlying pinning layers, in order to develop very strong unidirectional anisotropy. However, such seed and underlying pinning layers are not used in this embodiment of the top shield according to the present invention due to concerns on unwanted read gap increases which will degrade read resolution and thus decrease recording densities. In the embodiment shown in FIG. 7, no other ferromagnetic films are used. A ferromagnetic Co—Fe film may be used to replace either the entire Ni—Fe film or the part of the Ni—Fe film to develop stronger unidirectional anisotropy, but is not used in the present invention due to concerns as described below.

Figure 8:
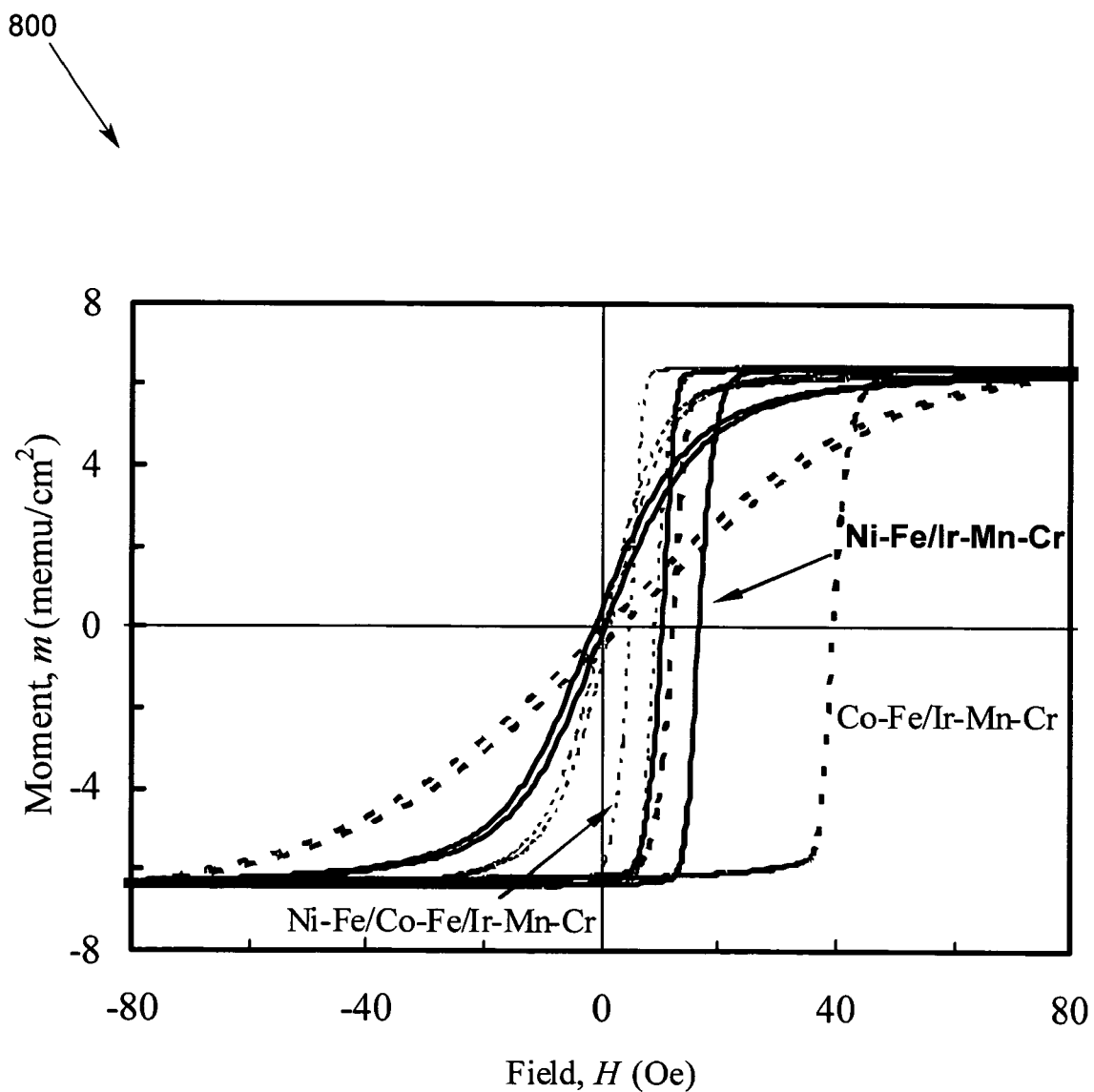
FIG. 8 is a plot of easy-axis and hard-axis magnetic responses of Ni—Fe(74.6)/Ir—Mn—Cr(6), Co—Fe(37.1)/Ir—Mn—Cr(6) and Ni—Fe(70)/Co—Fe(2)/Ir—Mn—Cr(6) films, all with saturation moments of about 6.3 memu/cm$^2$.

FIG. 8 is a plot 800 of easy-axis and hard-axis magnetic responses of Ni—Fe(74.6)/Ir—Mn—Cr(6), Co—Fe(37.1)/Ir—Mn—Cr(6) and Ni—Fe(70)/Co—Fe(2)/Ir—Mn—Cr(6) films, all with saturation moments of about 6.3 memu/cm$^2$. When a Co—Fe film replaces the entire Ni—Fe film, $H_{CE}$ increases from 2.1 to 13.6 Oe and $H_{UA}$ increases from 7.0 to 25.8 Oe. When a 2 nm thick Co—Fe film is sandwiched between the Ni—Fe and Ir—Mn—Cr films, $H_{CE}$ increases from 2.1 to 3.1 Oe and $H_{UA}$ increases from 7.0 to 13.5 Oe. The use of the Co—Fe film causes increases in both $H_{CE}$ and $H_{UA}$. However, $H_{CE}$ approaches $H_{UA}$, leading to a concern on unwanted hysteretic magnetization rotation. In addition, the Co—Fe film exhibits an unwanted positive saturation magnetization. The Co—Fe film is thus not used in this embodiment.

Figure 9:
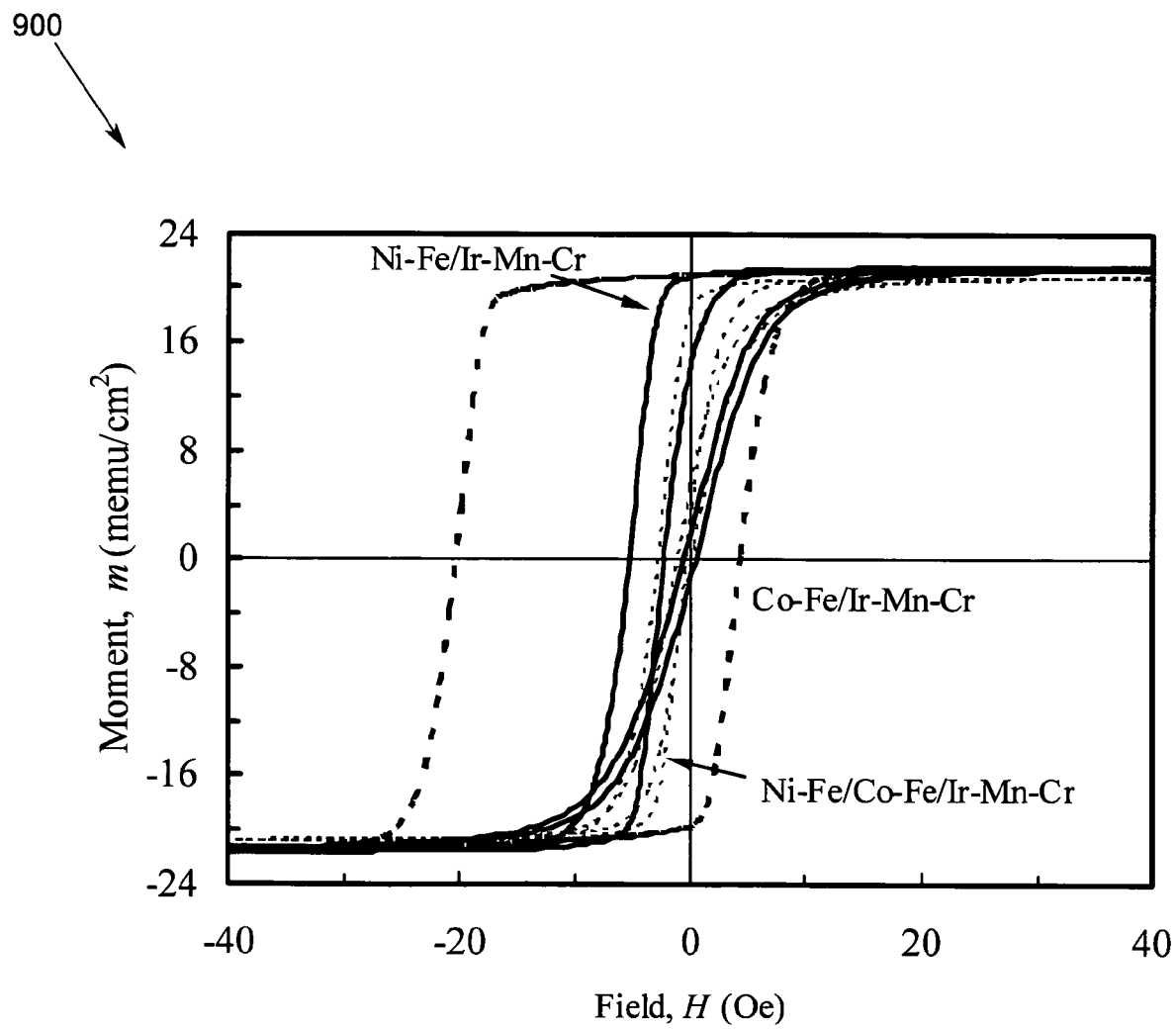
FIG. 9 is a plot of easy-axis and hard-axis magnetic responses of Ni—Fe(242.4)/Ir—Mn—Cr(6), Co—Fe(125.2)/Ir—Mn—Cr(6) and Ni—Fe(242.4)/Co—Fe(2)/Ir—Mn—Cr(6) films, all with saturation moments ($m_s$) of about a designed value (21 memu/cm$^2$)

FIG. 9 is a plot 900 of easy-axis and hard-axis magnetic responses of Ni—Fe(242.4)/Ir—Mn—Cr(6), Co—Fe(125.2)/Ir—Mn—Cr(6) and Ni—Fe(242.4)/Co—Fe(2)/Ir—Mn—Cr(6) films, all with saturation moments ($m_s$) of about a designed value (21memu/cm$^2$). When a Co—Fe film replaces the entire Ni—Fe film, $H_{CE}$ increases from 1.2 to 12.4 Oe and $H_{UA}$ increases from 1.6 to 8.1 Oe. When a 2 nm thick Co—Fe film is sandwiched between the Ni—Fe and Ir—Mn—Cr films, $H_{CE}$ increases from 1.2 to 1.5 Oe and $H_{UA}$ increases from 1.6 to 3.9 Oe. With such a high saturation moment, the Ni—Fe/Ir—Mn—Cr films exhibit such a low $H_{UA}$ that the top shield cannot be stabilized. Several layers of Ni—Fe/Ir—Mn—Cr laminates, each with a lower saturation moment and a higher $H_{UA}$, are thus needed to stabilize the top shield. On the other hand, with such a high saturation moment, the Co—Fe/Ir—Mn—Cr films exhibit $H_{CE}$ higher than $H_{UA}$. When $H_{CE}$ exceeds $H_{UA}$, unwanted hysteretic magnetization rotation will causes an uncertainty if the magnetization will return to the original state or rotate to an unwanted opposite magnetic state after any magnetic excitations.

Figure 10:
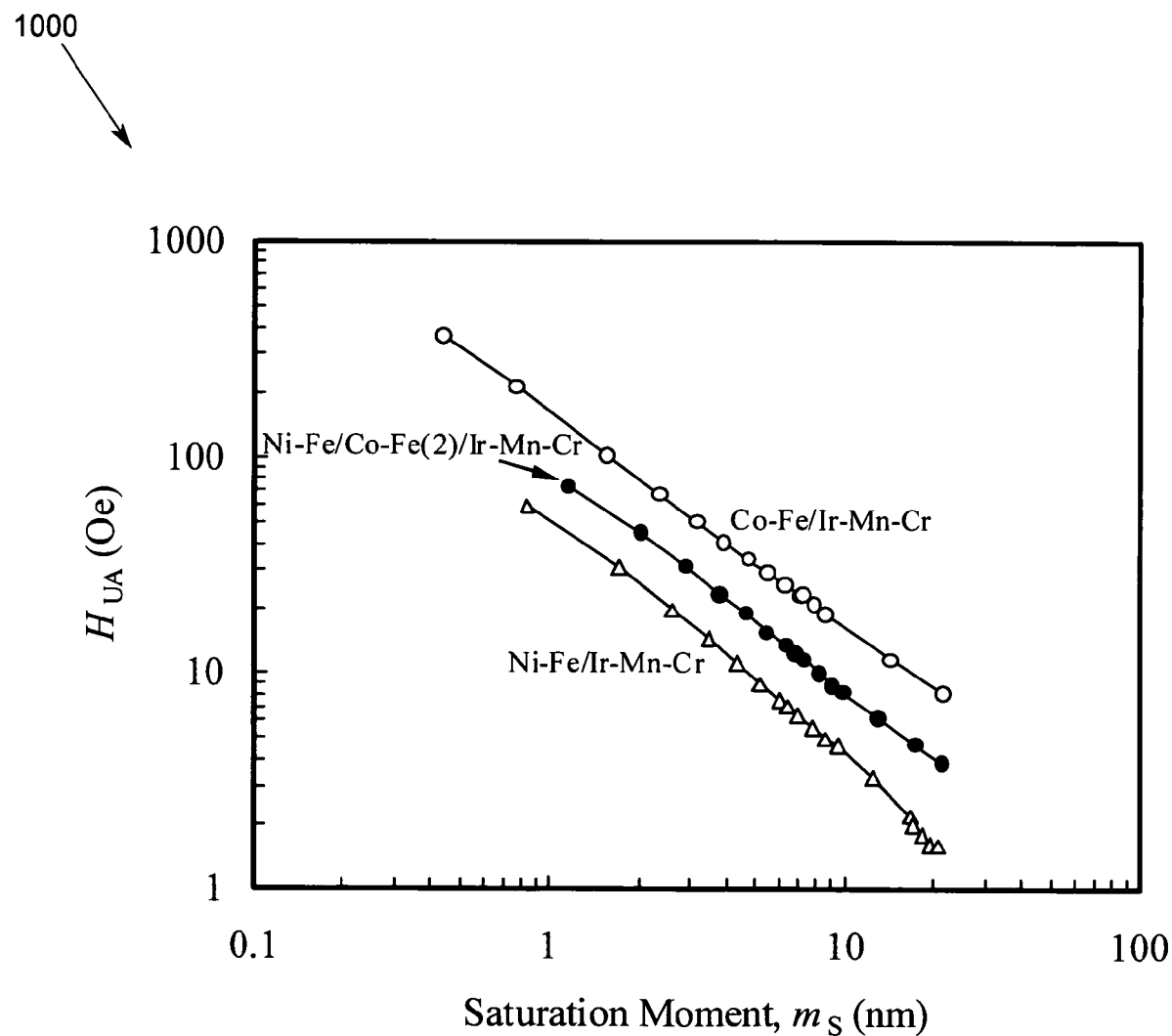
FIG. 10 is a plot of unidirectional anisotropy field ($H_{UA}$) versus saturation moment ($m_s$) for Ni—Fe/Ir—Mn—Cr(6), Co—Fe/Ir—Mn—Cr(6) and Ni—Fe/Co—Fe(2)/Ir—Mn—Cr(6) films.

FIG. 10 is a plot 1000 of unidirectional anisotropy field ($H_{UA}$) versus saturation moment ($m_s$) for Ni—Fe/Ir—Mn—Cr(6), Co—Fe/Ir—Mn—Cr(6) and Ni—Fe/Co—Fe(2)/Ir—Mn—Cr(6) films. $H_{UA}$ linearly decreases as $m_s$ increases. To stabilize the top shield while maintaining high permeability, $H_{UA}$ must exceed $H_{CE}$ and preferably be optimal in a range from 5 to 50 Oe. The Ni—Fe film thickness in each laminate can be selected based on FIG. 10 in order to attain a designed $H_{UA}$.

Figure 11:
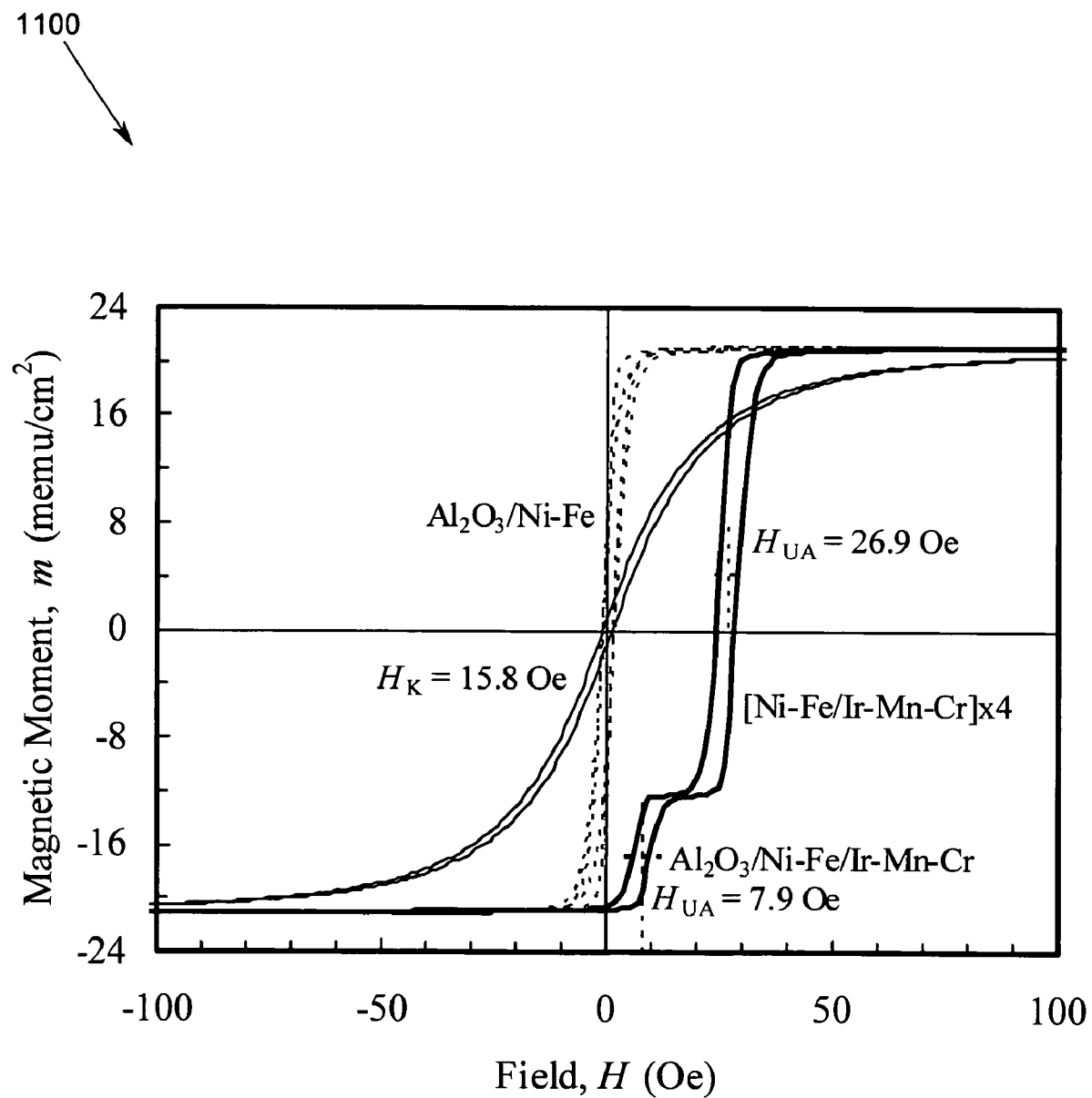
FIG. 11 is a plot showing easy-axis and hard-axis magnetic responses of a top shield comprising [Ni—Fe(48.4)/Ir—Mn—Cr(6)]×5/Ta(3) films.

FIG. 11 is a plot 1100 showing magnetic responses of a top shield comprising [Ni—Fe(48.4)/Ir—Mn—Cr(6)]×5/Ta(3) films. Without suitable seed layers, the first laminate exhibit an $H_{CE}$ of 1.3 Oe and an $H_{UA}$ of 7.9 Oe. As long as $H_{CE}$ is smaller than $H_{UA}$, such a low $H_{UA}$ is good enough to stabilize the top shield, and in fact is preferable since the first laminate plays a more crucial role than the others laminates in shielding and thus a higher permeability is preferable. On the other hand, with the first Ni—Fe/Ir—Mn—Cr laminate as seed layers, all the other laminates exhibit an $H_{CE}$ of 2.0 Oe and an $H_{UA}$ of 26.9 Oe. Such a high $H_{UA}$ ensures good top-shield stabilization. To meet any special designs, thicknesses of the first Ni—Fe film and the other Ni—Fe films can be adjusted based on FIG. 9, and the number of laminates can be adjusted to attain a designed moment.

Figure 12:
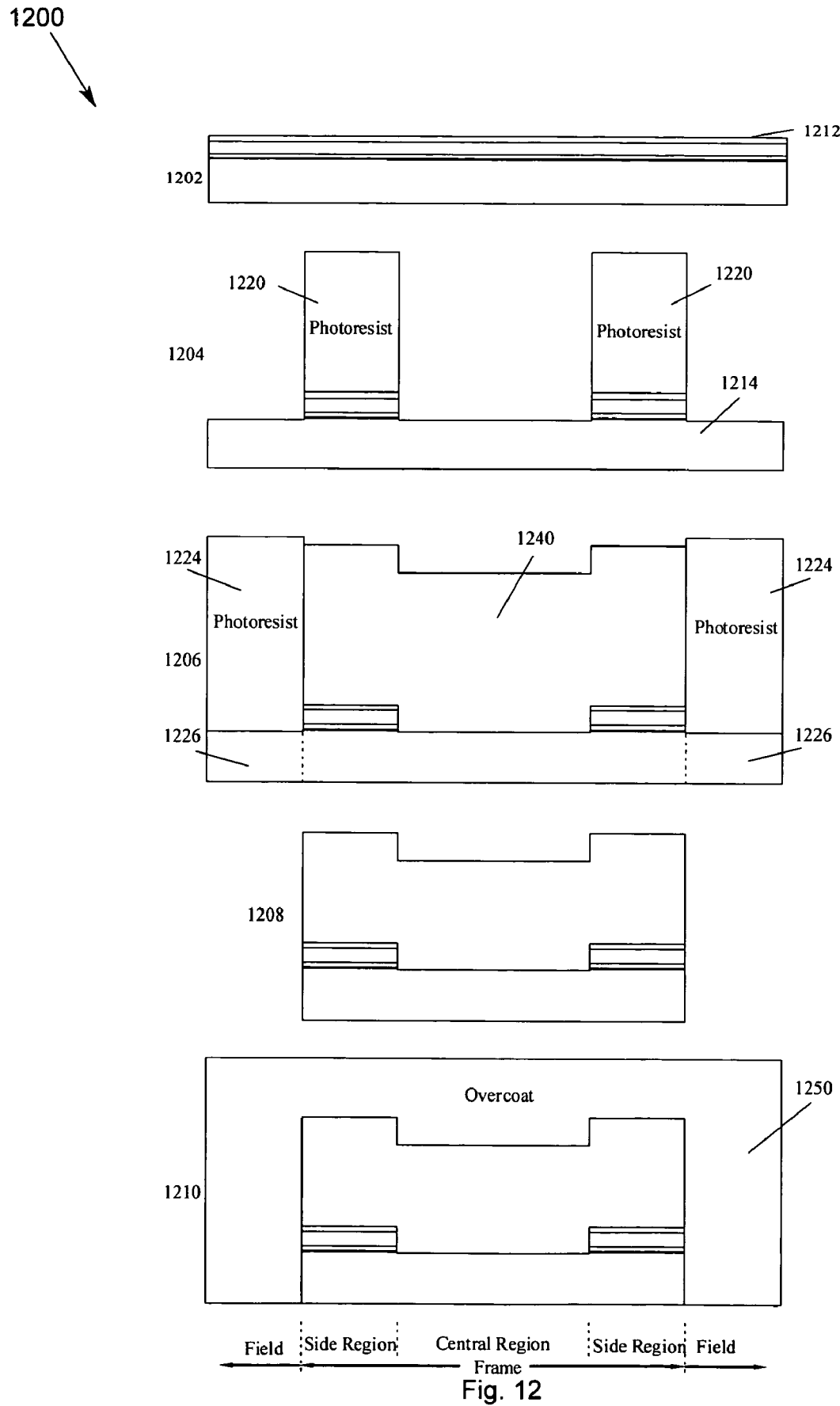
FIG. 12 illustrates the formation process of the top shield according to an alternative embodiment of the present invention.

FIG. 12 illustrates the formation process of the top shield 1200 according to the alternative embodiment of the present invention. At a step 1202, multiple layers 1212 comprising Ni—Fe(72)/Co—Fe(2)/Ir—Mn—Cr(6)/Co—Fe(20)/Ni—Fe(10) films are deposited on a wafer. At a step 1204, a photoresist 1220 is applied and exposed in a photolithographic tool to mask the multiple layers 1212 in side regions of a frame. The multiple layers 1212 in the unmasked central region of the frame and in a field outside the frame are removed by ion mill until the underlying Ni—Fe film 1214 is exposed. At a step 1206, another photoresist 1224 is then applied and exposed in a photolithographic tool to open the frame. Chemical etching is applied to remove about 2 nm thick the Ni—Fe film, and plating is conducted to deposit a 400 nm thick Ni—Fe film 1240 on the remaining 70 an thick Ni—Fe film 1214 in the frame. At a step 1208, the photoresist 1224 is removed, and ion mill is then applied to remover at least 70 nm thick Ni—Fe films over the entire wafer, in order to completely clear out the remaining Ni—Fe film 1226 outside the frame. At a step 1210, a 100 nm thick Al$_2$O$_3$ film 1250 is deposited on the wafer, and an anneal is conducted again in a field of 1,000 Oe parallel to the longitudinal direction for 2 hours at 220° C. This second anneal is conducted for the top pole to develop strong unidirectional anisotropy in the side regions, without interrupting magnetizations in the Ir—Mn—Cr/Co—Fe/Ru/Co—Fe transverse flux-closure structure in the TMR sensor 612. Those skilled in the art will recognize that the present invention is not meant to be limited to the exact dimensions, times and temperatures presented herein, but rather are presented merely as one embodiment of the present invention.

Accordingly, FIG. 12 illustrates a shield layer that includes a ferromagnetic Ni—Fe film formed in a central region of a frame, and multiple layers including ferromagnetic Ni—Fe, ferromagnetic Co—Fe, antiferromagnetic Ir—Mn—Cr, ferromagnetic Co—Fe, and ferromagnetic Ni—Fe films formed in side regions of the frame. Unidirectional anisotropy induced at the Co—Fe/Ir—Mn—Cr and Ir—Mn—Cr/Co—Fe interfaces in the side regions is maximized by selecting suitable compositions and thicknesses of the Co—Fe and Ir—Mn—Cr films, in order to achieve the stabilization of the top shield through magnetostatic interactions between the central and side regions.

The fabrication process of a read head, as described above may also be conducted here except that the formation process of the top shield 620 as shown in FIG. 6 is fabricated according to the embodiment of the present invention described in FIG. 12.

Figure 13:
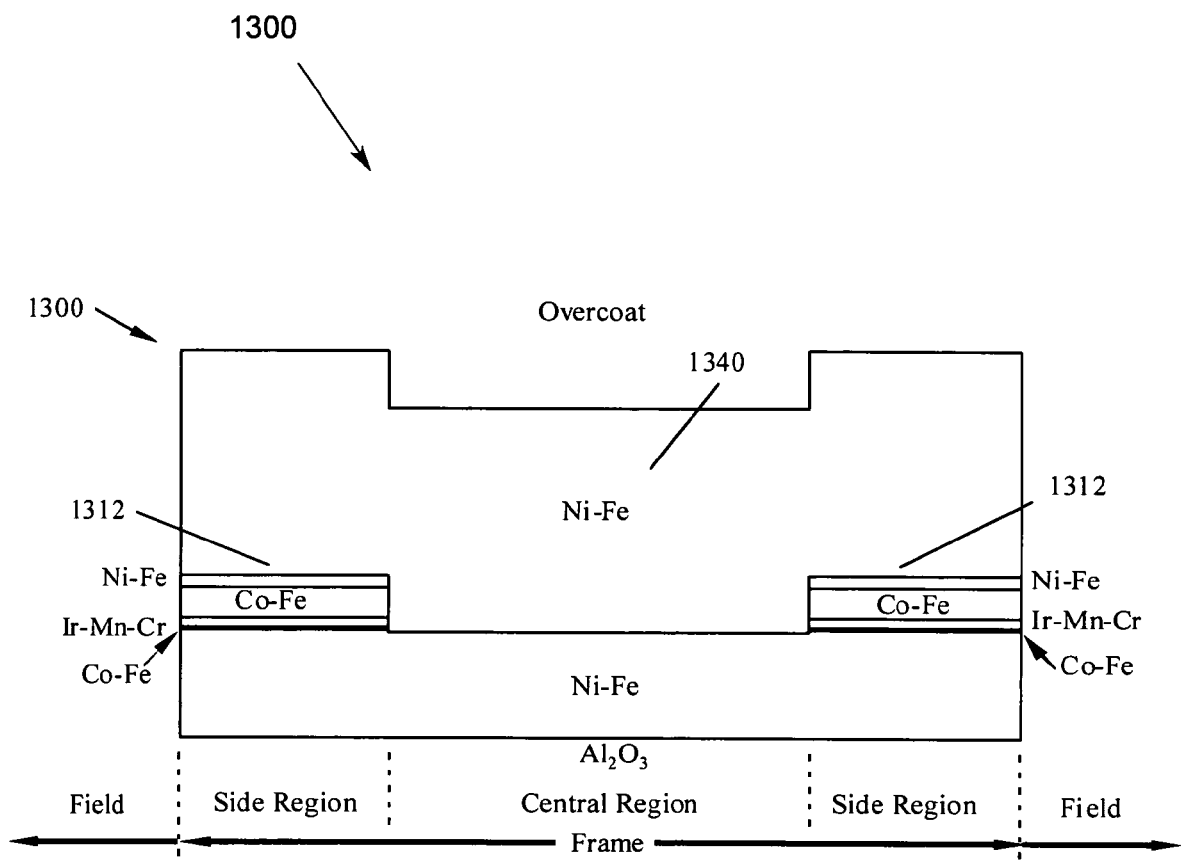
FIG. 13 shows a cross-sectional view of the top shield formed according to the alternative embodiment of the present invention.

FIG. 13 shows a cross-sectional view of the top shield 1300 formed according to this alternative embodiment of the present invention. The Ni—Fe film 1340 is located in the central region, while the multilayers 1312 include Ni—Fe/Co—Fe/Ir—Mn—Cr/Co—Fe/Ni—Fe films are located in the side regions. In FIG. 13, ferromagnetic Co—Fe films are still not used in the central region to alleviate concerns on its positive saturation magnetostriction, but are used in the side regions to develop strong unidirectional anisotropy at the Co—Fe/Ir—Mn—Cr and Ir—Mn—Cr/Co—Fe interfaces.

The fabrication process of a write head, as described in the preferred embodiment of the present invention, can also be conducted here. After depositing 20 µm thick Al₂O₃ overcoat on the wafer, the wafer is cut and mechanically lapped into many sliders.

Figure 14:
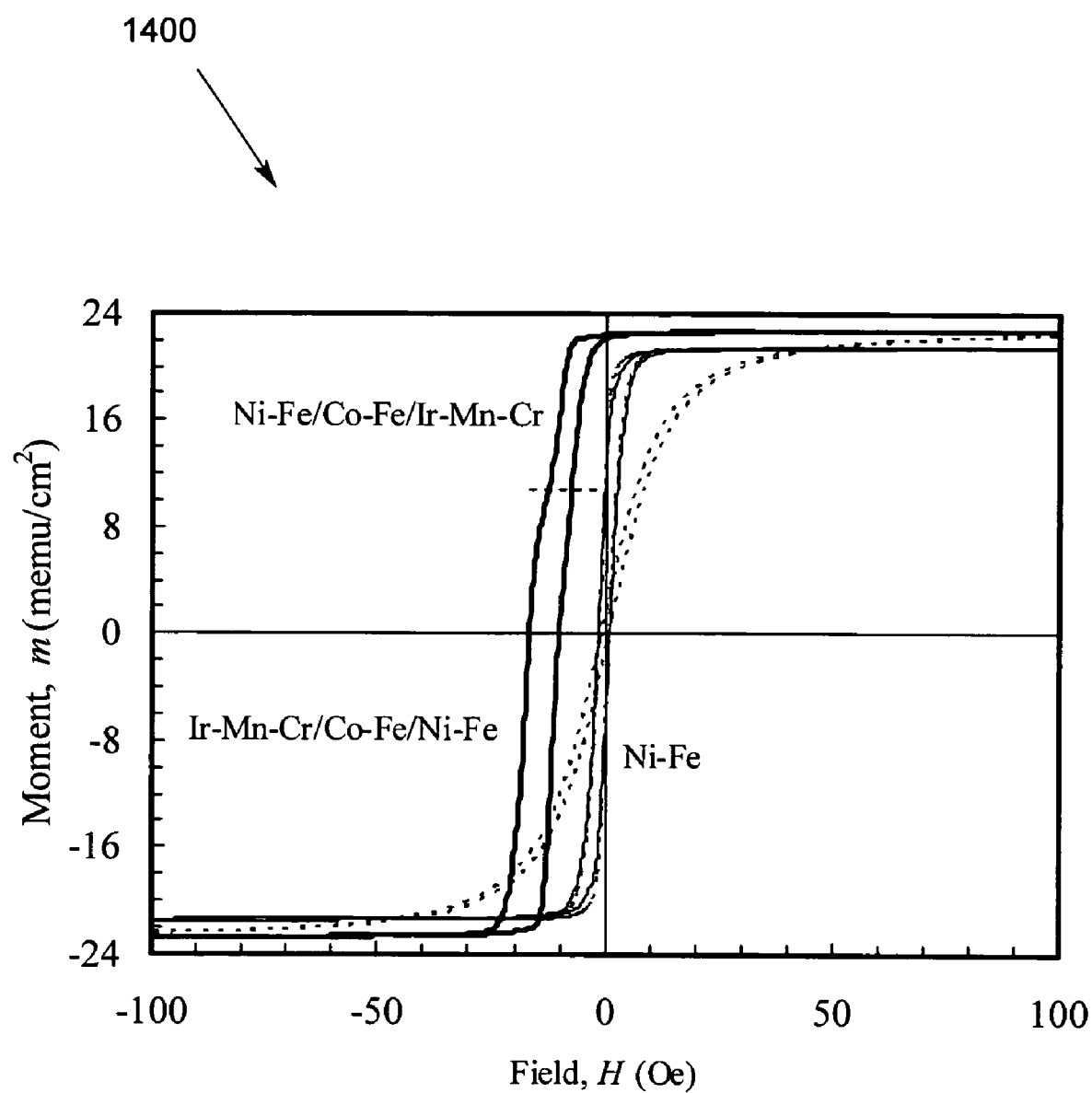
FIG. 14 is a plot showing easy-axis and hard-axis magnetic responses of Ni—Fe(250) and Ni—Fe(72)/Co—Fe(2)/Ir—Mn—Cr(6)/Co—Fe(20)/Ni—Fe(150) films.

FIG. 14 is a plot 1400 showing easy-axis and hard-axis magnetic responses of Ni—Fe(250) and Ni—Fe(70)/Co—Fe(2)/Ir—Mn—Cr(6)/Co—Fe(20)/Ni—Fe(150) films. The Ni—Fe film exhibits typical soft ferromagnetic properties suitable for the use as the top shield in the central region. On the other hand, the Ni—Fe/Co—Fe/Ir—Mn—Cr films exhibit an $H_{CE}$ of 3.0 Oe and an $H_{UA}$ of 6.9 Oe, while the Ir—Mn—Cr/Co—Fe/Ni—Fe films exhibit an $H_{CE}$ of 3.4 Oe and an $H_{UA}$ of 16.5 Oe. With such unidirectional anisotropy in the side regions, magnetizations in the side regions are pinned, while the magnetization in the central region is free to rotate with needed stability due to magnetostatic interactions between the side and central regions.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A top shield for a read sensor comprising a laminate structure, wherein a plurality of shield layers and at least one bias layer are alternatively deposited, wherein a thickness of the plurality of shield layers is selected to attain a designed unidirectional anisotropy of the laminate structure and to maintain the unidirectional anisotropy of the laminate structure greater than easy-axis coercivity of the laminate structure.

2. The top shield of claim 1, wherein the shield layer comprises a ferromagnetic nickel(Ni)-iron (Fe) film, and the bias layer comprises an antiferromagnetic iridium(Ir)-manganese(Mn)-chromium(Cr) film.

3. The top shield of claim 2, wherein the ferromagnetic Ni—Fe film has a Fe content ranging from 10 to 50% (in atomic percent) and a thickness ranging from 40 to 100 nm, the antiferromagnetic Ir—Mn—Cr film has a Mn content ranging from 50 to 90 at (in atomic percent), a Cr content ranging from 0 to 10% (in atomic percent), and a thickness ranging from 4 to 10 nm.

4. The top shield of claim 1, wherein the laminated structure includes five layers of Ni—Fe and five layers of Ir—Mn—Cr bias layers alternately formed.

5. The top shield of claim 1, wherein the laminate structure comprises multiple layers formed only at side regions, a shield layer being formed in a central region between the laminate structure.

6. The top shield of claim 5, wherein the shield layer comprises a ferromagnetic Ni—Fe film, and the laminate structure comprises a ferromagnetic Ni—Fe film, a ferromagnetic cobalt(Co)-Fe film, an antiferromagnetic Ir—Mn—Cr film, a ferromagnetic Co—Fe film, and a ferromagnetic Ni—Fe film.

7. The top shield of claim 6, wherein the ferromagnetic Ni—Fe film has a Fe content ranging from 10 to 50% (in atomic percent) and a thickness ranging from 40 to 100 nm, the ferromagnetic Co—Fe film has a Fe content ranging from 10 to 50% (in atomic percent) and a thickness ranging from 1 to 20 nm, and the antiferromagnetic Ir—Mn—Cr film has a Mn content ranging from 50 to 90 at (in atomic percent), a Cr content ranging from 0 to 10% (in atomic percent), and a thickness ranging from 4 to 10 nm.

8. A method for forming a top shield; comprising forming a laminate structure of alternating a plurality of shield layers and at least one bias layer, wherein a thickness of the shield layer is selected to attain a designed unidirectional anisotropy of the laminate structure and to maintain the unidirectional anisotropy of the laminate structure greater than easy-axis coercivity of the laminate structure.

9. The method of claim 8, wherein the laminate structure is confined with patterning and is annealed in a longitudinal field ranging from 100 to 2,000 Oe at a temperature ranging from 200 to 240° C.

10. The method of claim 8, wherein the forming a laminate structure further comprises:
depositing multiple layers comprising a first Ni—Fe layer, a first Co—Fe layer, an Ir—Mn—Cr layer, a second Ni—Fe layer and a second Co—Fe layer on a wafer;
applying a first photoresist over the multiple layers to mask the multiple layers in side regions of a frame;
removing unmasked multiple layers in the central region of the frame and in a field outside the frame by ion milling, until the underlying first Ni—Fe layer is exposed in the central region and in the field, leaving the multiple layers in the side regions;
applying a second photoresist to open the frame and mask the field;
chemically etching the exposed first Ni—Fe layer in the central region and the exposed second Ni—Fe layer in the two side regions; and
plating a third Ni-Fe layer on the first Ni—Fe layer in the central region and the exposed second Ni—Fe layer in the two side regions.

11. The method of claim 10 further comprising:
removing the second photoresist;
ion milling the N—Fe layer over the entire wafer, until the Ni—Fe first layer in the field is completely removed; and depositing an Al₂O₃ film.

12. The method of claim 10 further comprising:
annealing the wafer in a longitudinal field ranging from 100 to 2,000 Oe at a temperature ranging from 200 to 240° C. to develop unidirectional anisotropy in a longitudinal direction.

13. The method of claim 8, wherein the forming a laminate structure of alternating shield and bias layers further comprises forming five layers of Ni—Fe and five layers of Ir—Mn—Cr bias layers alternately.

14. A storage device, comprising:
a moveable magnetic storage medium for storing data thereon;
a slider that has a transducer made of write and read heads;
a suspension arm above the rotating magnetic disk;
an actuator arm that swings the suspension arm to place the transducer over selected areas of the magnetic storage medium; and
a magnetoresistive sensor, coupled to the actuator, for reading data from the magnetic recording medium when position to a desired location by the actuator, wherein the magnetoresistive sensor further comprises a top shield layer, the top shield layer comprises a laminate structure formed by alternately depositing a plurality of shield layers and at least one bias layer, wherein a thickness of the shield layer is selected to attain a designed unidirectional anisotropy of the laminate structure and to maintain the unidirectional anisotropy of the laminate structure greater than easy-axis coercivity of the laminate structure.

15. The storage device of claim 14, wherein the shield layer comprises a ferromagnetic nickel(Ni)-iron (Fe) film, and the bias layer comprises an antiferromagnetic iridium(Ir)-manganese(Mn)-chromium(Cr) film.

16. The storage device of claim 15, wherein the ferromagnetic Ni—Fe film has a Fe content ranging from 10 to 50% (in atomic percent) and a thickness ranging from 40 to 100 nm, the antiferromagnetic Ir—Mn—Cr film has a Mn content ranging from 50 to 90 at (in atomic percent), a Cr content ranging from 0 to 10%(in atomic percent), and a thickness ranging from 4 to 10 nm.

17. The storage device of claim 14, wherein the laminated structure includes five layers of Ni—Fe and five layers of Ir—Mn—Cr alternately formed.

18. The storage device of claim 14, wherein the laminate structure comprises multiple layers formed only at side regions, a shield layer being formed in a central region between the laminate structures.

19. The storage device of claim 18, wherein the shield layer comprises a ferromagnetic Ni—Fe film, and the laminate structure comprises a ferromagnetic Ni—Fe film, a ferromagnetic cobalt(Co)-Fe film, an antiferromagnetic Ir—Mn—Cr film, a ferromagnetic Co—Fe film, and a ferromagnetic Ni—Fe film.

20. The storage device of claim 19, wherein the ferromagnetic Ni—Fe film has a Fe content ranging from 10 to 50% (in atomic percent) and a thickness ranging from 40 to 100 nm, the ferromagnetic Co—Fe film has a Fe content ranging from 10 to 50% (in atomic percent) and a thickness ranging from 1 to 20 nm, and the antiferromagnetic Ir—Mn—Cr film has a Mn content ranging from 50 to 90 at (in atomic percent), a Cr content ranging from 0 to 10%(in atomic percent), and a thickness ranging from 4 to 10 nm.

21. A top shield for a read sensor comprising a laminate structure, wherein the laminate structure comprises at least three layers of alternating antiferromagnetic bias and feromagnetic shield layers, wherein an antiferromagnetic bias layer is disposed between two ferromagnetic layers and wherein a thickness of the shield layer is selected to attain a designed unidirectional anisotropy of the laminate structure and to maintain the unidirectional anisotropv of the laminate structure greater than easy-axis coercivity of the laminate structure.

22. The top shield of claim 21, wherein the laminate structure includes five layers of Ni—Fe and five layers of Ir—Mn—Cr bias layers alternately formed.

23. The top shield of claim 21, wherein the laminate structure a first and second laminate structure formed only at side regions, and wherein a shield layer is formed in a central region between the first and second laminate structures.

24. The top shield of claim 23, wherein the shield layer comprises a ferromagnetic Ni—Fe film, and the first and second laminate structures comprises a ferromagnetic Ni—Fe film, a ferromagnetic cobalt(Co)—Fe film, an antiferromagnetic Ir—Mn—Cr film, a ferromagnetic Co—Fe film, and a ferromagnetic Ni—Fe film.

25. A method for forming a top shield; comprising forming at least three layers of alternating antiferromagnetic bias and feromagnetic shield layers, wherein an antiferromagnetic bias layer is disposed between two ferromagnetic layers and wherein a thickness of the shield layer is selected to attain a designed unidirectional anisotropy of the laminate structure and to maintain the unidirectional anisotropy of the laminate structure greater than easy-axis coercivity of the laminate structure.

26. The method of claim 25, wherein the forming the at least three layers of alternating antiferromagnetic bias and feromagnetic shield layers farther comprises:
depositing multiple layers comprising a first Ni—Fe layer, a first Co—Fe layer, an Ir—Mn—Cr layer, a second Ni—Fe layer and a second Co—Fe layer on a wafer;
applying a first photoresist over the multiple layers to mask the multiple layers in side regions of a frame;
removing unmasked multiple layers in the central region of the frame and in a field outside the frame by ion milling, until the underlying first Ni—Fe layer is exposed in the central region and in the field, leaving the multiple layers in the side regions;
applying a second photoresist to open the frame and mask the field;
chemically etching the exposed first Ni—Fe layer in the central region and the exposed second Ni—Fe layer in the two side regions;
plating a third Ni—Fe layer on the first Ni—Fe layer in the central region and the exposed second Ni—Fe layer in the two side regions;
removing the second photoresist;
ion milling the N—Fe layer over the entire wafer, until the Ni—Fe first layer in the field is completely removed; and
depositing an $Al_2O_3$ film.

27. The method of claim 25, the forming the at least three layers of alternating antiferromagnetic bias and feromagnetic shield layers further comprises forming five layers of Ni—Fe and five layers of Ir—Mn—Cr bias layers alternately.

* * * * *